United States Patent [19]

Abysov et al.

[11] Patent Number: 5,020,279
[45] Date of Patent: Jun. 4, 1991

[54] MACHINE TOOL FOR MANUFACTURE AND DRESSING OF TOOLS AND FOR FINISH-MACHINING OF GEAR WHEELS

[76] Inventors: Nikolai A. Abysov, Valery A. Bezgodov, Vladimir S. Belgorodsky, Nikolai D. Plotnikov, all of Saratov, U.S.S.R.

[73] Assignee: Saratovskoe Spetsialnoe Konstruktorskoe Bjuro Zuboobrabaty-Vajuschikh Stankov Saratovskogo Stankostro-Itelnogo Proiznodstvennogo Obiedinenia, U.S.S.R.

[21] Appl. No.: 392,918
[22] PCT Filed: Sep. 28, 1988
[86] PCT No.: PCT/SU88/00192
§ 371 Date: Jul. 28, 1989
§ 102(e) Date: Jul. 28, 1989
[87] PCT Pub. No.: WO89/05703
PCT Pub. Date: Jun. 29, 1989

[30] Foreign Application Priority Data

Dec. 24, 1987 [SU] U.S.S.R. .............................. 4342342

[51] Int. Cl.⁵ .................. B23F 19/00; B24B 53/06
[52] U.S. Cl. ................................ 51/123 G; 51/26;
51/105 GG; 51/287; 51/5 D

[58] Field of Search ................... 51/26, 105 GG, 287, 51/5 D, 123 G, 131.1

[56] References Cited

U.S. PATENT DOCUMENTS 2,996,847 8/1961 Saari .

FOREIGN PATENT DOCUMENTS

3508065AI 9/1985 Fed. Rep. of Germany .
3506499AI 9/1986 Fed. Rep. of Germany .
3336593CI 10/1989 Fed. Rep. of Germany .
248461 12/1969 U.S.S.R. .................................. 51/26
671950 9/1979 U.S.S.R. .
848201 7/1981 U.S.S.R. .

Primary Examiner—Frederick R. Schmidt
Assistant Examiner—Blynn Shideler
Attorney, Agent, or Firm—Ladas & Parry

[57] ABSTRACT

A machine tool for the manufacture and dressing of tools and for finish-machining of gear wheels comprising three spindles (4, 5, 15) installed in the heads (2, 3, 17) of their own and provided with drives (8, 11), two of said spindles (4, 5) being synchronously connected with each other and the third spindle (15) is capable of free rotation and axial movement in the head (17) having radial and angular settings.

1 Claim, 3 Drawing Sheets

MACHINE TOOL FOR MANUFACTURE AND DRESSING OF TOOLS AND FOR FINISH-MACHINING OF GEAR WHEELS

TECHNICAL FIELD

The present invention relates to the manufacture of precision gear wheels and, more generally, to a machine-tool for the manufacture and dressing of tools and finish-machining of gear wheels.

BACKGROUND OF THE INVENTION

Known in the prior art ( SU, A, No. 848201) is a machine tool for finish-machining of bevel gear wheels with circular teeth. The machine tool comprises a tool head with a mechanism for hypoid offset of the tool spindle, and a work head carrying a spindle on which is mounted a carriage with an additional spindle, capable of being offset on a hypoid principle relative to the rotation axis of the work head, and a work generating mechanism. To ensure synchronous rotation of the tool and work, the carriage mounts a summation mechanism. The hypoid distance of the work is set by an eccentric mechanism. However, the provision of a large number of degrees of freedom of the work spindle, an additional spindle with an additional hypoid offset relative to the main spindle of the work head, and a generating mechanism, all this imparts the rigidity of the machine tool and, consequently, the accuracy of machining. Besides, the summation mechanism which synchronizes rotation of both spindles fails to ensure a strictly coordinated rotation of the work and tool within the entire range of the generating motion which introduces additional errors into the machining accuracy.

There is known another machine tool (DE, A I, No. 3 506 499) for precision machining of gear wheels. In this machine tool the tool and the work make up a pair of bevel gear wheels, each installed on one end of its spindle. The other end of each spindle is mounted with one helical spur guiding wheel, both constituting a screw pair. The guiding wheels are arranged coaxially with the tool and work and have the same speed ratio as the tool-and-work pair. Such a design of the machine tool ensuring kinematic interaction between the spindles of the work and tool and their working feed during machining limits the possibilty of selecting the geometrical dimensions of the toothed tool since each particular speed ratio of the tool-and-work gear pair calls for making a set of guiding wheels with the same speed ratio. When the function of the guiding wheels are fulfilled by a bevel gear pair, the working feed setting mechanism complicates the design of the machine tool to such an extent that the maximum rigidity of the machine tool cannot guarantee the high quality machining of precision gear wheels. And the manufacture of a tool in the form of an abrasive toothed wheel on this machine without additional mechanisms is possible.

The closet in its essence to the disclosed machine tool is the machine tool (SU, A No. 671950) for finish machining of bevel and hypoid gear wheels wherein the work and tool spindles are provided with drives electrically linked with each other for kinematic interaction. The speed ratio of the work-and-tool gear pair is ensures by the change gears of the indexing quadrant fitted on the tool spindle. The machine tool has no mechanism for the working feed required for making the toothed abrasive tool. When the function of the working feed mechanism is fulfilled by the setting-up mechanism of the head of one of the spindles, one cycle of this machine tool enables making a toothed abrasive tool for machining only one element of a gear pair. When making the tool for the other element of the pair it is necessary to change the tool settings, i.e. the ratio of the work and spindle speeds, the base distance of the tool and work, etc. The same disadvantage exists when this machine tool is used for finish machining of gear wheels.

SUMMARY OF THE INVENTION

An object of the present invention resides in providing a machine tool for the manufacture and dressing of a tool and for the finish machining gear wheels by introducing an additioanl axial feed of the tool.

This object is attained by providing a machine tool for the manufacture and dressing of the tool and for finish machining of gear wheels comprising first and second spindles in a head and provided with their own drives which are, however, synchronously linked with each other which, there also, is provided a third spindle with a provision for free rotation and axial motion in its own head. It is capable of moving radially in vertical and horizontal directions and tilting through a present angle.

Besides, the machine tool can be fitted with a plate installed on which a provision for radial movement in vertical and horizontal directions in the head of the third spindle, said plate being linked kinematically with the heads of the first and second spindles with a provision for angular motion.

The plate carrying the third tool spindle and interconnecting woth work heads increases considerably the rigidly of the machine tool thus ensuring high accuracy of manufacturing the tool, dressing it and finish-machining the precision gear pairs with said tool.

BRIEF DESCRIPTION OF DRAWINGS

Now the invention will be described in detail by way of example with reference to the accompanying drawings in which.

BEST MODE OF CARRYING OUT THE INVENTION

Figure 1:
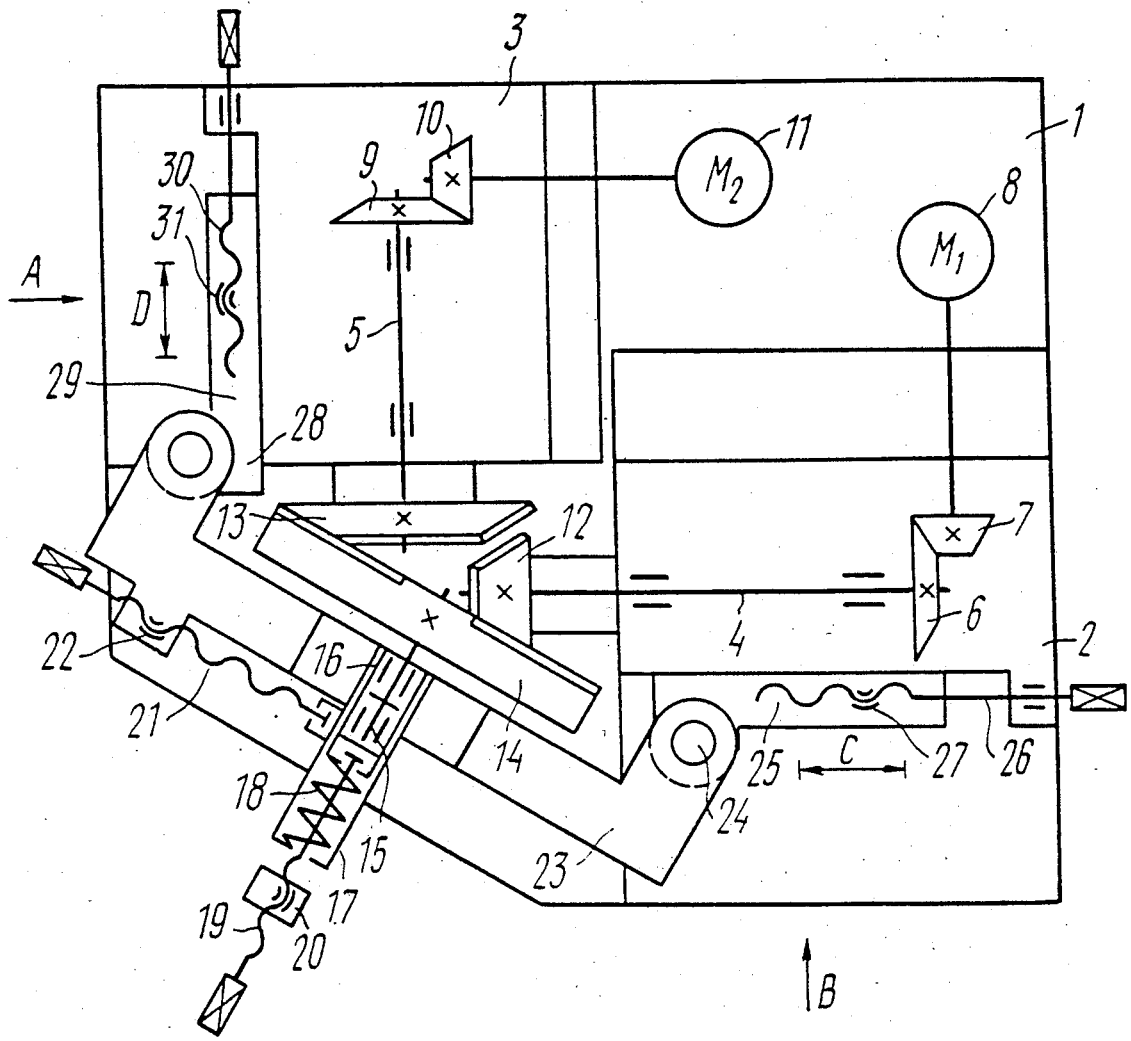
FIG. 1 is the plan view of the machine tool for the manufacture and dressing of the tool and for finish machining of gear wheels according to the invention.

The claimed machine tool for the manufacture and dressing of tools and for finish machining of gear wheels comprises heads 2 and 3 with respective first and second spindles 4 and 5 with rotational drives of their own, both heads 2, 3 being mounted on bed 1 (FIG. 1). The drive of spindle 4 incorporates a hypoid gear pair 6 and 7 with a large speed ratio and an electric motor 8 while the drive of spindle 5 incorporates a similar pair 9 and 10 and electric motor 11. The electric motors 8 and 11 are coupled electrically with each other (not shown in the Figure) for synchronous rotation. Pinion 12 and gear wheel 13, the elements of the gear pair, are mounted on spindles 4 and 5 which are perpendicular to define relative horizontal and vertical perpendicular directions.

Figure 2:
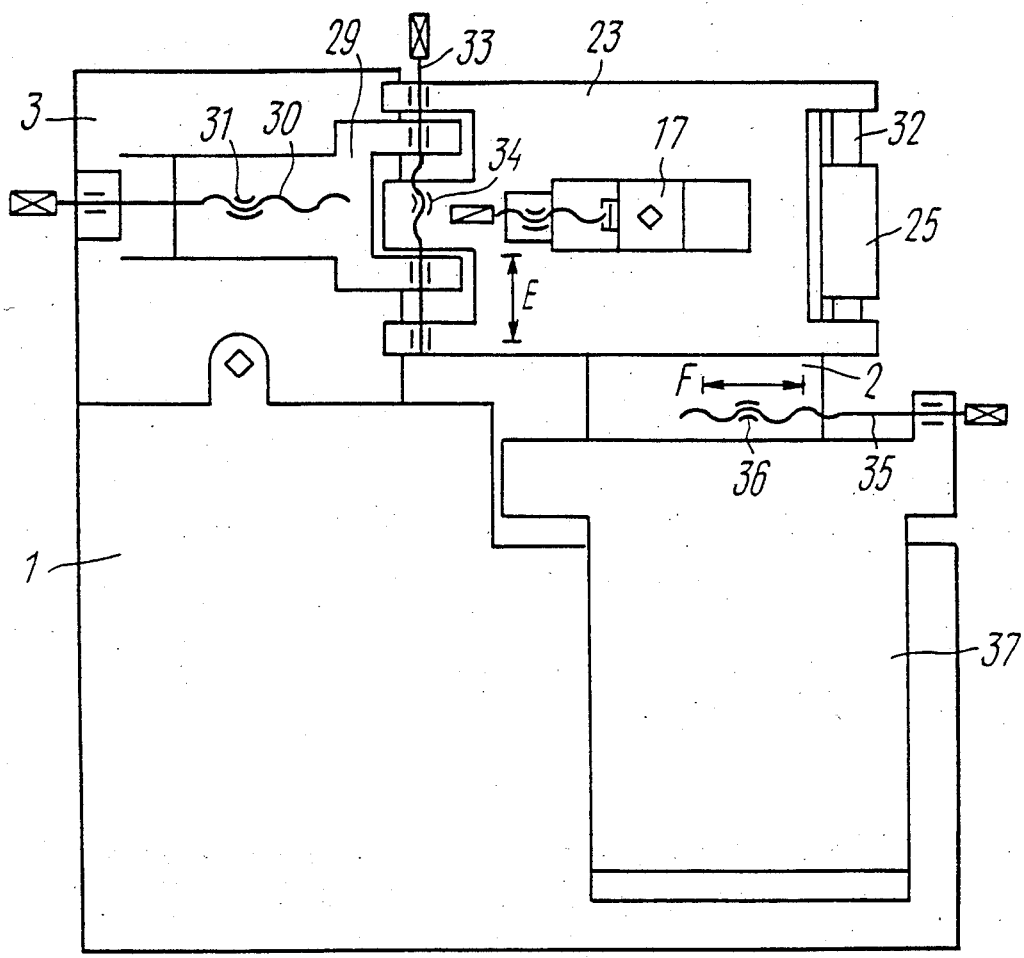
FIG. 2 is a view along arrow A in FIG. 1.
Figure 3:
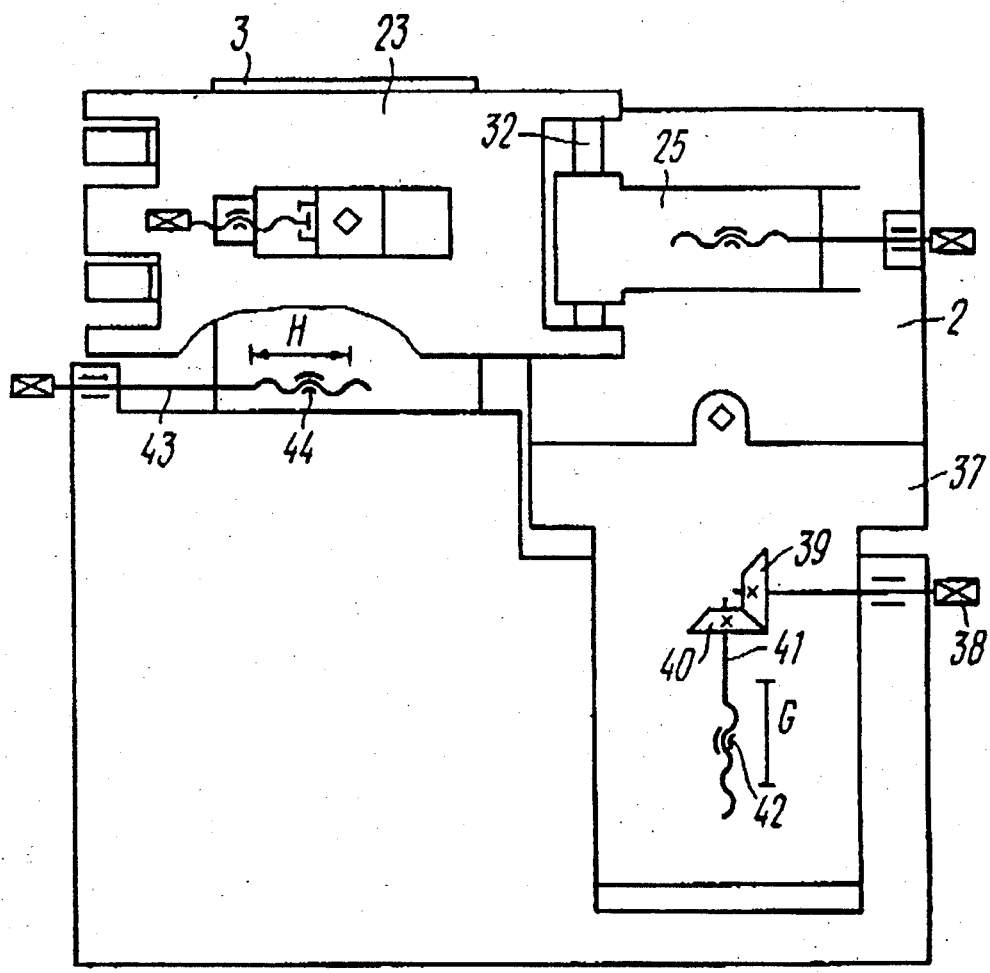
FIG. 3 is a view along arrow B in FIG. 1.

The tool 14 in the form of a flat abrasive toothed wheel with concentric gear rims (not shown in the Figure) whose teeth have a profile mutually enveloping the teeth of pinion 12 and gear wheel 13 for driving thereby is installed on a free-rotating third spindle 15 installed in the casing 16. The casing 16 is located in the tool head 17 and is connected therewith by spring 18. Screw 19 with limiting nut 20 interacts with the casing 16. for radial, horizontal and vertical movement the head 17 is connected with plate 25 via lead screw 21 and 22. The plate 23 is connected by articulated joint 24 with the slide 25 which is capable of moving in the head 2 in the direction of arrow C with the aid of lead screw 26 and nut 27. The hinge joint 28 connects the plate 23 with the slide 29 which can be moved in the head 3 in the direction of arrow D by the lead screw 30 and nut 31. The hinge joint 24 comprises a rod 32 (FIG. 2) rigidly secured in the plate 23. The rod 32 can be secured with the slide 25 by means of a clamping device (not shown in the Figure). The hinge joint 28 consists of a lead screw 33 connected with the nut 34 secured in the plate 23 owing to which the plate 23 with the tool head 17 installed thereon can move vertically in the direction of arrow E for hypoid offset of the tool 14. The head 2 is moved in the direction of arrow F by the lead screw 35 with nut 36. The head 2 can be moved together with the upright 37 vertically in the direction of arrow G (FIG. 3) by the handle 38, bevel gear pair 39, 40, lead screw 41 and nut 42. The head 3 is moved along arrow H by the lead screw 43 and nut 44.

The machine of the present invention can work in two modes.

For operating in the tool-making mode (tool 14 in FIG. 1) the heads 2 and 3 with the pinion 12 and wheel 13 secured on the spindles 4 and 5 (the pinion and wheel are constituted by a reference gear pair from the lot a gears to be machined) are set at the required base distances found by calculations. The heads 2 and 3 are set by lead screws 35 and 43, respectively. By turning the plate 23 around the hinge joint 28 the spindle 15 is withdrawn from the machining zone and the blank of the tool, i.e. a standard abrasive wheel, is installed on said spindle after which the plate 23 is brought to the working position and the rod 32 in fixed on the slide 25. By moving slides 25 and 29 the tool blank 14 is set at the required angle to the pinion 12 and wheel 13. The tool head 17 is moved by the lead screw 21 to the required (design) position of the tool 14. Spring 18 presses the face of the abrasive wheel, (bank of tool 14), against the outer cone of the teeth of pinion 12 and wheel 13. The adjusting hut 20 is turned on screw 19 to a position providing for the axial travel of the spindle 15 over a distance equal to the depth of tooth of the reference pair. By rotating the lead screw 33 (FIG. 3), the design hypoid offset of the tool blank 14 is set relative to the wheel 13 while the hypoid offset of the pinion 12 relative to the tool blank 14 is set by rotating the handle 38 (FIG. 3) i.e. by the vertical displacement of the upright 37 with the head 2. This completes the setting-up process of the machine tool. For making the tool 14, start electric motors 8 and 11 (FIG. 1) which rotate pinion 12 and wheel 13 at a strictly definite speed ratio. The tooth contact zone of the pinion 12 and wheel 13 with the tool blank 14 is fed with free abrasive material. In view of the fact that the teeth of the pinion 12 and wheel 13 transmit the torque to the tool blank 14 simultaneously and from different sides of its centre line, there is no slipping in the point of contact between the teeth of the gear pair and the tool blank 14. Owing to the presence of free abrasive material, the abrasive grains are chipped out of the solid abrasive tool blank 14 by the action of the contacting teeth of the pinion 12 and wheel 13 thus simultaneously shaping the mating teeth of two concentric gear rims of the tool 14. As the abrasive grains are gradually chipped out, the tool blank 14 is moved forward by the spring 18 until the limiting nut 20 comes to bear against the face of the tool head 17. This marks the end of making the tool 14.

Operation of the machine tool in the mode of finish-machining of the lot of gear pairs differ in that the gear wheels 12 and 13 are installed on spindles 4 and 5 and the teeth of the gear rims of the tool 14 are brought in mesh with the teeth of the gear wheels 12 and 13 being machined. The point of engagement of the teeth of the tool 14 with the teeth of the gear wheels 12 and 13 is fed instead of free abrasive with a cutting fluid to protect the tool 14 against greasing and to wash out the products of machining. Machining is carried on with a tangential (circular) feed ensured by the electric motors 8 and 11.

The machine tool of the present invention is capable of working in two modes of dressing the abrasive tool 14: firstly, periodical dressing of the tool 14 after the latter has lost its geometrical accuracy and secondly, dressing of the tool after its active surface has become worn to the point of sharpening of the tooth tops.

The geometrical accuracy of the gear rims of the tool 14 is restored by means of the pinion 12 and aheel 13 of the reference gear pair which was used for generating the tool 14 or by means of a gear pair whose parameters are similar to those of the reference pair but provided with a diamond layer applied to the tooth surface. Dressing is carried out with tangential loading similarly to the finish machining. If the dressing tool is constituted by the pinion 12 and wheel 13 of the reference pair, the zone of tooth contact of the pair and of the gear rims of the abrasive tool 14 is fed with free abrasive material. If the utilized gear pair has a diamond layer, the contact zone is fed with the cutting material.

The process of dressing the tool 14 for restoring the worn teeth is fully identical with the above-described technology of manufacturing the abrasive tool 14. In this case the nut 20 is moved over the screw 19 increasing the axial travel of the tool spindle 15 by the value required for shaping the total thickness of teeth of the gear rims of the abrasive tool 14. Periodical dressing for the restoration of worn teeth of the tool 14 is carried out to the point of complete using up the thichness of the standard abrasive wheel. It should be noted, that, apart from the axial position of the tool spindle 15, other settings of the machine tool are not affected.

INDUSTRIAL APPLICABILITY

The use of the disclosed technical solution will allow a single machine tool, for the first time ever, to perform four operations which are now performed by a multitude of diverse sophisticated equipment. The disclosed machine tool for the manufacture and dressing of the tool for finish machining gear wheels utilizing the claimed technical solution is capable of:

manufacturing a high-precision abrasive tool of a complex profile whose teeth feature the best conjugation with the teeth of the gear wheels being machined;

periodical dressing of this tool as soon as it loses its geometrical accuracy;

restoring the worn teeth of the tool to the complete using up the thickness of the standard abrasive wheel;

finish machining of the precision gear pairs, i.e. simultaneous machining of the mating wheel and pinion with an efficiency at least twice as high as that of any existing machines of a similar application.

The machine is simple to operate. The transition from one opeartion, e.g. shaping an abrasive tool of a complex profile to another, e.g. finish machining of gear pairs is carried out actually without labour-consuming resettings.

Owing to these peculiarities the machine tool is widely used at enterprises with any scope of output from individual and small-scale to quantity production.

We claim:

1. In a machine tool for the manufacture of dressing tools and finish machining of gear wheels, the machine tool having a tool (14) and first and second, perpendicular spindles (4, 5) that defines relative horizontal and vertical, perpendicular directions, the first and second spindles (4, 5) being rotatably on respective, first and second heads (2, 3) and having respective but synchronous rotational drives (8, 11), the improvement comprising:

a third spindle (15) on which the tool (14) is fixed for rotational driving about an axis of the third spindle (15) from the first and second spindles (4, 5), the third spindle (15) being freely rotatable about its axis in a third head (17);

axial movement means (18, 19, 20) on the third head (17) for moving the third spindle (15) axially and away from the first and second heads (2, 3);

a plate (23);

radial movement means (21, 22) connecting the third head (17) to the plate (23) for moving the third head (17) and third spindle (15) therein radially of the third spindle in the relative horizontal and vertical directions relative to the first and second spindles (4, 5); and angular movement means (24, 28) for tilting the plate (23) and, thereby, the third spindle (15) angularly of the axis of the third spindle (15), wherein the angular movement means (24, 28) comprise hinge joints (24, 28) on the plate (23) respectively on diametrically opposite sides of the third spindle (15) and linking means (25, 26, 27 and 29, 30, 31) respectively linking the hinge joints (24, 28) movably to the first and second heads (2, 3) for the angular tilting of the plate (23) and third spindle (15).

* * * * *